Jan. 6, 1925.
G. E. HOLMES ET AL
1,522,126
AUTOMOBILE INCLOSURE
Filed June 2, 1921 2 Sheets-Sheet 1
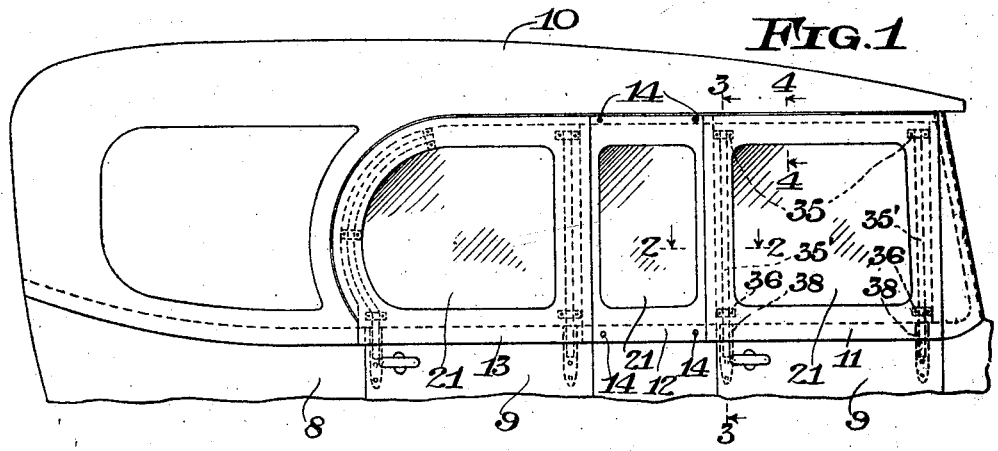
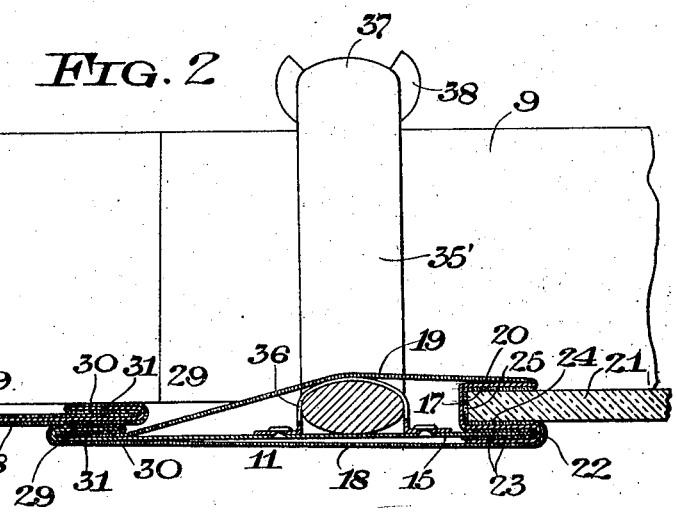
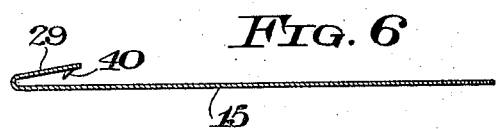
WITNESSES
H. D. Chase
C. L. Naal
INVENTORS
Gustav E. Holmes
John M. Bostrom &
Axel G. Bostrom
By R. S. Caldwell
ATTORNEY Jan. 6. 1925.  G. E. HOLMES ET AL  1,522,126
AUTOMOBILE INCLOSURE
Filed June 2, 1921    2 Sheets-Sheet 2
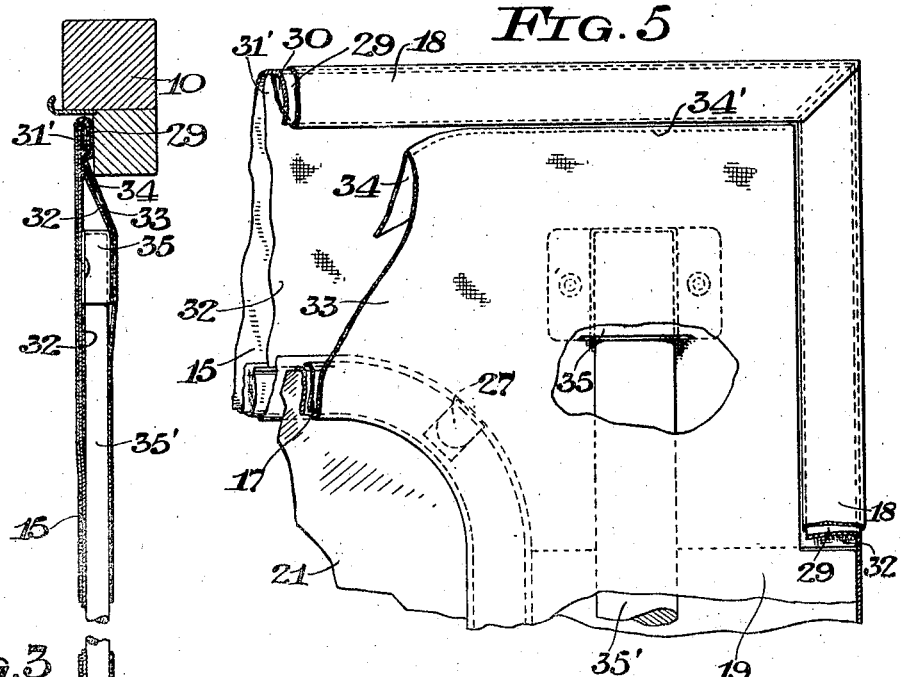
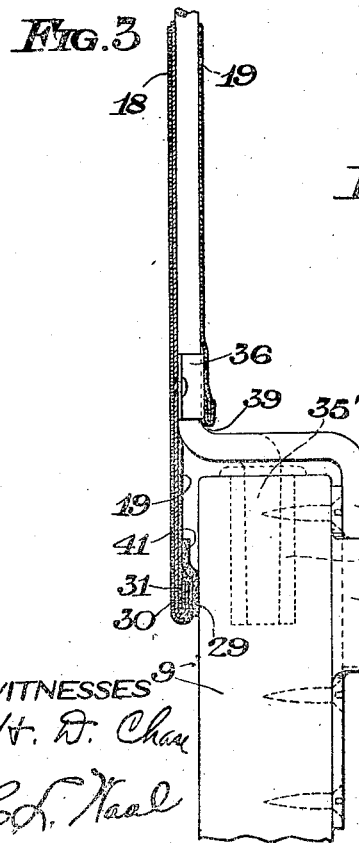
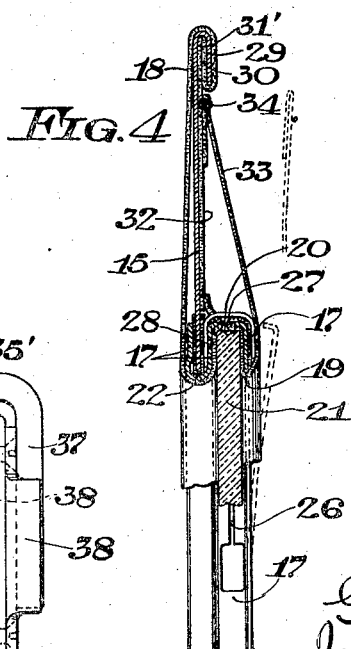
INVENTORS
Gustav E. Holmes,
John M. Bostrom,
Carl G. Bostrom
By R. S. Caldwell
ATTORNEY
WITNESSES
H. D. Chase
C. L. Naal Patented Jan. 6, 1925.

1,522,126

UNITED STATES PATENT OFFICE.

GUSTAV E. HOLMES, JOHN M. BOSTROM, AND AXEL G. BOSTROM, OF MILWAUKEE, WISCONSIN.

AUTOMOBILE INCLOSURE.

Application filed June 2, 1921. Serial No. 474,396.

*To all whom it may concern:*

Be it known that we, GUSTAV E. HOLMES, JOHN M. BOSTROM, and AXEL G. BOSTROM, citizens of the United States, and residents of Milwaukee, in the county of Milwaukee and State of Wisconsin, have invented new and useful Improvements in Automobile Inclosures, of which the following is a description, reference being had to the accompanying drawings, which are a part of this specification.

The invention relates to automobile inclosures for covering the space between the usual top structure and body of an automobile so as to protect the occupants from the weather.

One of the objects of this invention is to provide removable side curtains or panels of sheet metal covered with weatherproof material on the outside and lined on the inside.

A further object is to provide a new and improved form of window frame for the side curtains or panels of automobile inclosures.

A further object of this invention is to provide a covered sheet metal side curtain or panel and a metal window frame with its glass-receiving grooves lined with the covering of the panel.

The invention further consists in the several features hereinafter set forth and more particularly defined by claims at the conclusion hereof.

In the drawings: Fig. 1 is a side view of an automobile equipped with side curtains or panels embodying the invention; Fig. 2 is a section taken on the line 2—2 of Fig. 1; Fig. 3 is a section taken on the line 3—3 of Fig. 1; Fig. 4 is a section taken on the line 4—4 of Fig. 1; Fig. 5 is a detail view of the side panel, parts being broken away; Fig. 6 is a detail view of the sheet metal panel.

In the drawings the numeral 8 indicates an automobile body having the usual side doors 9 and with a fixed or folding top 10.

The side curtains or panels extend from the sides of the automobile to the top and as here shown the automobile is equipped with side curtains or panels 11, 12 and 13. The panels 11 and 13 are each mounted to move with the doors while the intermediate panel 12 is detachably secured by suitable fasteners 14 to the side of the body and the top 10.

Each side curtain or panel comprises a sheet metal body or frame 15 having an opening therein in which a sheet metal window frame 17 is mounted, a covering 18 for the outside of said body and a lining 19 for said body.

The frame 17 is formed of a strip of relatively thin sheet metal bent reversely upon itself to form an S-shaped cross-section, such strip being also bent to conform to the shape of the opening in the body 15. In cross-section the frame 17 presents an inwardly opening groove 20 to receive the edges of the window-light 21 and an outwardly opening groove 22 to receive the body 15. Silencing strips 23 may be used at the joints between the body 15 and the groove 22. The frame 17 is tightly clamped to the sides of the window opening in the body by pressing it into tight engagement therewith. The outside covering 18 extends around the bend forming the groove 22 and has its inner edge 24 attached to the one side and the bottom of the groove 20. The inner covering 19 extends around one side of the frame 17 and has its inner edge 25 attached to the other side of the groove 20. The glass 21 fits in the frame 11 between these faced sides formed by the edges 24 and 25. One portion of the frame 17 is split longitudinally of the groove 20, as at 26, in order that the glass may be inserted in the frame. Sheet metal clips 27 are provided with tongues 28 securing them to the frame 17 and are adapted to be bent over the split portions of the frame to hold them together, see Fig. 4. The location of the split will depend upon the shape of the window-frame which varies with different shaped panels.

The body portion 15 has inturned marginal edges 29. The outside covering 18 passes around and beneath these edges with its outer edge secured as at 30, Fig. 2. The inside covering 19, with one exception, is secured at its outer edge 31 adjacent the edge 30, both of these edges being tightly pressed between the body 15 and its edge 29, as well as cemented thereto. The exception to this manner of fastening the covering 19 to the body is on the side of the panel from which the glass is inserted into the frame 17. At this side we provide a backing piece 32 pasted down on the back of the body portion and having its outer edge 31′ secured similar to the edges 31, and the main portion of the lining at the opening side of the frame 17 is extended to form a closing flap 33 whose turned in edge 34 is stitched, as at 34′, or otherwise suitably secured to the backing piece 32. Stitching is used so that the flap may be readily opened in case it is necessary to put in a new window-light in the frame 17.

Where the panels, as 11 and 13, are adapted to be moved with the doors, a pair of sheet metal caps 35 are riveted to the body 15 to form sockets to receive the door rods 35′, and a pair of guides 36 are likewise secured to the lower portion of the body 15 through which these rods pass, the shanks 37 of the door rods being mounted in sockets 38 on the doors 9. The door rods may be readily removed from the sockets 38 and they may also be removed from the panels, as a slit 39 is provided in the inner lining to permit insertion or withdrawal of the door rods from the panel.

Instead of using cement or adhesive for securing the fabric or curtain coverings to the sheet metal plate or body 15 of the panel, the edges 29 of the panel may be provided with spurs 40 bent out therefrom and adapted to be imbedded in the coverings. A pad 41 of soft material is preferably secured to the lower edge of each panel to prevent marring the doors or side of the automobile.

The side curtain or panel construction presents a finished and pleasing appearance, is very durable and may be readily taken down when desired.

We desire it to be understood that this invention is not to be limited to any specific form or arrangement of parts except in so far as such limitations are specified in the claims.

What we claim as our invention is:

1. A removable side curtain for automobile inclosures comprising a sheet metal panel forming the body of the curtain and having inturned edges, and an outside covering and an inside covering having their outer edges secured between the panel and said edges.

2. A removable side curtain for automobile inclosures comprising a sheet metal panel forming the body of the curtain and having inturned edges, an outside covering and an inside covering having their outer edges secured between the panel and its edges, and spaced door rod sockets and guides secured to the sheet metal panel beneath the inside covering.

3. A removable side curtain for automobile inclosures comprising a sheet metal panel forming the body of the curtain and having a window opening, a sheet metal window frame secured to the sides of said opening and having a window-receiving groove, and an inner covering and an outer covering for the panel secured thereto at their outer edges and secured within the window-receiving groove.

4. A removable side curtain for automobile inclosures comprising a sheet metal panel forming the body of the curtain and having a window opening, a sheet metal window frame having an outer groove for connection with the sides of the window opening of the panel and in inner groove for receiving the window, an outside covering for the panel, and an inside covering for the panel.

5. A removable side curtain for automobile inclosures comprising a sheet metal panel forming the body of the curtain and having a window opening, a sheet metal window frame having an outer groove for connection with the sides of the window opening of the panel and inner groove for receiving the window, an inside covering for the panel secured to one side of the window groove of said frame, an outside covering for the panel secured to the other side of the window groove, and means securing the outer edges of said covering to the panel.

6. A removable side curtain for automobile inclosures comprising a sheet metal panel forming the body of the curtain and having a window opening, a sheet metal window frame having an outer groove for connecting with the sides of the window opening of the panel and an inner groove for receiving the window, an inside covering for the panel secured to one side of the window groove, an outside covering secured to the other side of the window groove, said panel having inturned edges, and the inner and outer coverings having their outer edges secured beneath said inturned edges.

7. In a side curtain for automobile inclosures, the combination of a sheet metal panel forming the body portion of the curtain and having a window opening, a sheet metal window frame secured to the sides of said opening and having a window-receiving groove, the grooved portion of said frame being slit on one side to introduce the window therein, bendable sheet metal tabs having tongues securing them to the frame and adapted to hold the slit portions of said frame in closed position, and means detachably securing said panel to the side of the automobile.

8. In a side curtain for automobile inclosures the combination of a sheet metal panel forming the body portion of the curtain and having a window opening, a sheet metal window frame secured to the sides of said opening and having a window-receiving groove provided with separable portions on one side to introduce the window therein, an outer covering for the panel and an inner covering for the panel having a detachable flap to permit insertion of the window in said frame, means securing the separable portions of the window frame in closed position, and means detachably securing the panel to the side of the automobile.

In testimony whereof, we affix our signatures, in presence of two witnesses.

GUSTAV E. HOLMES.
JOHN M. BOSTROM.
AXEL G. BOSTROM.

Witnesses:
GUST ANDERSON,
WALFRID JOHNSON.